United States Patent
Ghiraldi et al.

(10) Patent No.: US 11,415,694 B2
(45) Date of Patent: Aug. 16, 2022

(54) APPARATUS FOR REAL TIME AND ON LINE ANALYSIS OF THE AGRICULTURAL CROP

(71) Applicant: DINAMICA GENERALE S.P.A., Poggio Rusco (IT)

(72) Inventors: Andrea Ghiraldi, Poggio Rusco (IT); Alberto Barbi, Poggio Rusco (IT)

(73) Assignee: DINAMICA GENERALE S.P.A., Poggio Rusco (IT)

( * ) Notice: Subject to any disclaimer, the term of this patent is extended or adjusted under 35 U.S.C. 154(b) by 0 days.

(21) Appl. No.: 16/398,897

(22) Filed: Apr. 30, 2019

(65) Prior Publication Data

US 2019/0369243 A1 Dec. 5, 2019

(30) Foreign Application Priority Data

May 29, 2018 (IT) .......................... 102018000005823

(51) Int. Cl.
| | | |
|---|---|---|
| *G01S 17/04* | (2020.01) | |
| *A01D 41/127* | (2006.01) | |
| *G01N 21/55* | (2014.01) | |
| *G01S 7/481* | (2006.01) | |
| *G02B 5/20* | (2006.01) | |

(52) U.S. Cl.
CPC .......... *G01S 17/04* (2020.01); *A01D 41/1277* (2013.01); *G01N 21/55* (2013.01); *G01S 7/4813* (2013.01); *G02B 5/20* (2013.01); *G01N 2223/052* (2013.01); *G01N 2223/612* (2013.01); *G01N 2333/415* (2013.01)

(58) Field of Classification Search
CPC ............. G01N 21/55; G01N 2223/052; G01N 2223/612; G01N 2333/415; G01N 2201/0216; G01N 21/255; G01N 21/276; G01S 7/4813; G01S 17/04; G02B 5/20; A01D 41/1277
See application file for complete search history.

(56) References Cited

U.S. PATENT DOCUMENTS

| | | | | |
|---|---|---|---|---|
| 3,773,424 | A | * | 11/1973 | Selgin .................... G01N 21/85 356/410 |
| 5,308,981 | A | | 5/1994 | Perten |
| 5,377,000 | A | * | 12/1994 | Berends .................... G01J 3/51 356/407 |

(Continued)

FOREIGN PATENT DOCUMENTS

| | | |
|---|---|---|
| DE | 3712879 A1 | 11/1988 |
| EP | 0388082 A2 | 9/1990 |

(Continued)

*Primary Examiner* — Thanh Luu
*Assistant Examiner* — Monica T Taba
(74) *Attorney, Agent, or Firm* — Pearne & Gordon LLP

(57) ABSTRACT

The apparatus (1) for agricultural crop analysis, comprises: a light source (2) for sending light radiation towards a crop; a plurality of sensors (21) for acquiring light radiation reflected by the crop and a plurality of filtering elements (22) adapted to enable complete passage only of light having frequencies within a predetermined passband.

The filtering elements (22) have passbands that differ from each other and each filtering element (22) is functionally coupled with a respective sensor (21) in such a manner that the latter receives only light radiation that has traversed the former.

13 Claims, 4 Drawing Sheets

(56) References Cited

U.S. PATENT DOCUMENTS

| | | | |
|---|---|---|---|
| 5,406,084 A | 4/1995 | Tobler et al. | |
| 5,748,221 A * | 5/1998 | Castelli | H04N 1/506 347/232 |
| 6,836,325 B2 * | 12/2004 | Maczura | G01J 3/02 356/328 |
| 7,169,040 B2 | 1/2007 | Kormann et al. | |
| 7,858,893 B1 * | 12/2010 | Haff | B07C 5/366 209/577 |
| 2005/0085283 A1 * | 4/2005 | Kormann | G01N 21/3563 460/7 |
| 2005/0147204 A1 * | 7/2005 | Kondo | G03F 7/70841 378/34 |
| 2014/0111792 A1 * | 4/2014 | Claussen | G01N 21/27 356/72 |
| 2018/0120224 A1 | 5/2018 | Dreyer et al. | |

FOREIGN PATENT DOCUMENTS

| | | |
|---|---|---|
| EP | 0511184 A1 | 10/1992 |
| EP | 1053671 | 11/2000 |
| EP | 1523874 | 4/2005 |
| EP | 3315947 A1 | 5/2018 |

\* cited by examiner

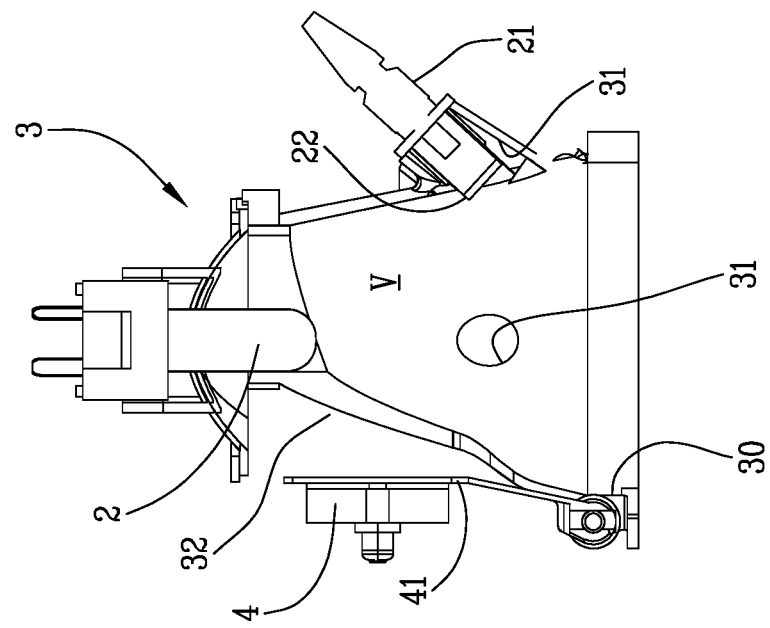
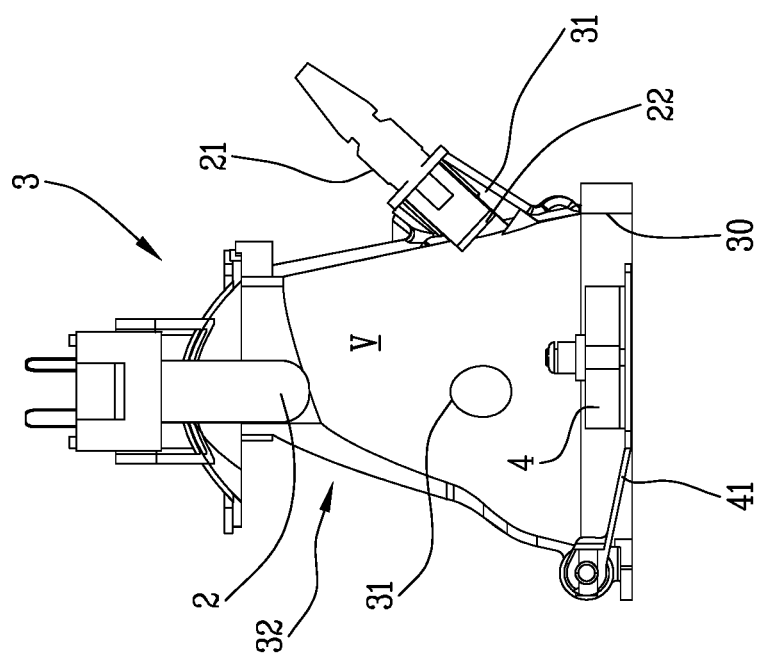

APPARATUS FOR REAL TIME AND ON LINE ANALYSIS OF THE AGRICULTURAL CROP

The object of the present invention is an apparatus for real time analysis of the crops to be applied to the harvesting machine to measure on line the actual content of dry matter and other nutritional parameters such as protein, starch, ADF, . . . . This invention finds justification within modern "precision agriculture", which can be described in different ways, but for which the universally accepted synthesis, "a system that supplies the instruments to do the right thing, in the right place, at the right moment" was reported by Pierce and Novak (1999). According to a more extensive definition of precision agriculture, this can be described as "company management [ . . . ] based on the observation, measurement and the response of the set of quantitative and qualitative variables [ . . . ] with the objective of optimizing yields within the framework of advanced sustainability of climatic and environmental, economic and social type" MIPAF—Precision Agriculture Guidelines 20160711.

For example, the possibility of measuring in real time the protein trend in the harvest gathered and the geolocation of the measured values is an important input datum for evaluating the optimum prescription map in terms of fertilizers.

Today, basically two classes of instruments are known that are able to evaluate in real time the quality of the crop that is being harvested:

Instruments that are able to measure only humidity: characterized by a limited cost, but by limited ability to manage variability in terms of predictions and accuracy. The prediction is based on measurements of electric parameters such as resistivity or capacitance of the material in transit in front of the probes.

Instruments that are able to measure the nutritional profile of the material: characterized by an important cost, but which are able to manage great variability in terms of predictions and accuracy. The prediction is in this case based on measurements of the reflected light analysed owing to the use of spectrophotometers.

Although the spectrophotometers offer good efficacy in the analysis of the harvest, they have some practical drawbacks.

First of all, as said, they are rather costly, and this has certainly limited the diffusion thereof on the market.

Further, the spectrophotometers are sensitive to the operating temperature and use thereof is limited to applications characterized by operating temperatures up to 40/50° C. In the field of harvesting machines, some are characterized by operating temperatures that sometimes exceed 80° Celsius. Such operating temperatures in fact prevent analysers from being implemented that are based on a spectrophotometer, thus excluding the possibility of a real-time and geolocated measurement of the nutritional parameters by means of a spectrophotometer analyser.

The technical task underlying the present invention is thus to propose an apparatus that is able to measure the nutritional profile of the crop by overcoming the aforesaid drawbacks.

This technical task is attained by the apparatus made according to claim 1.

Further characteristics and advantages of the present invention will become more apparent from the following indicative, and hence non-limiting, description of a preferred, but not exclusive, embodiment of the apparatus according to the invention, as illustrated in the accompanying drawings, in which.

Figure 3:
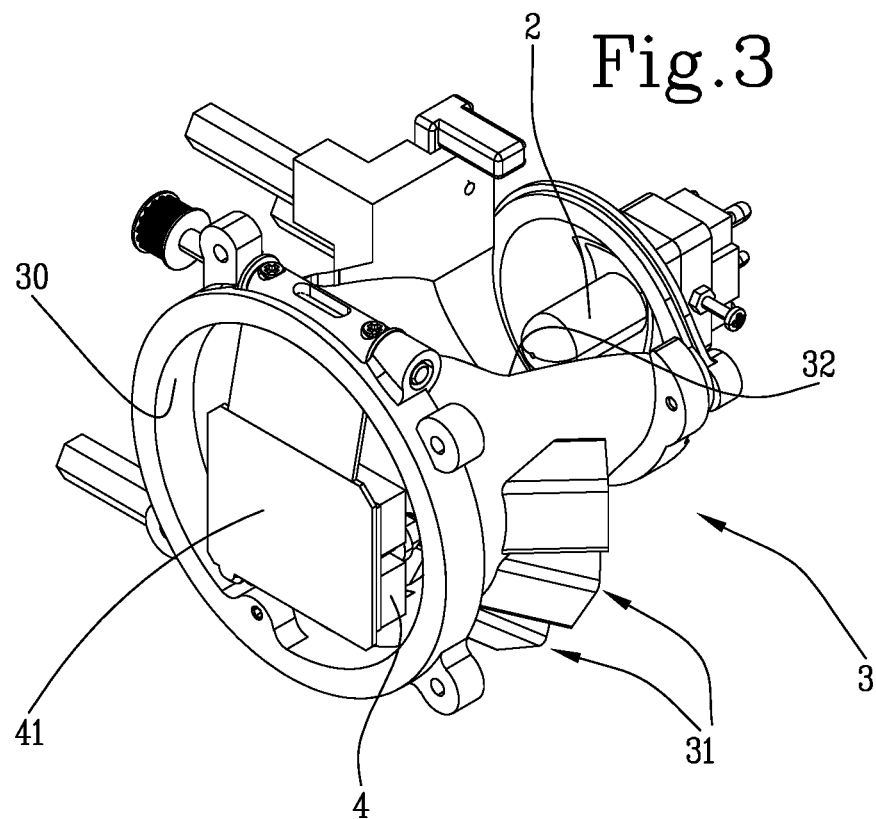
Figure 4:
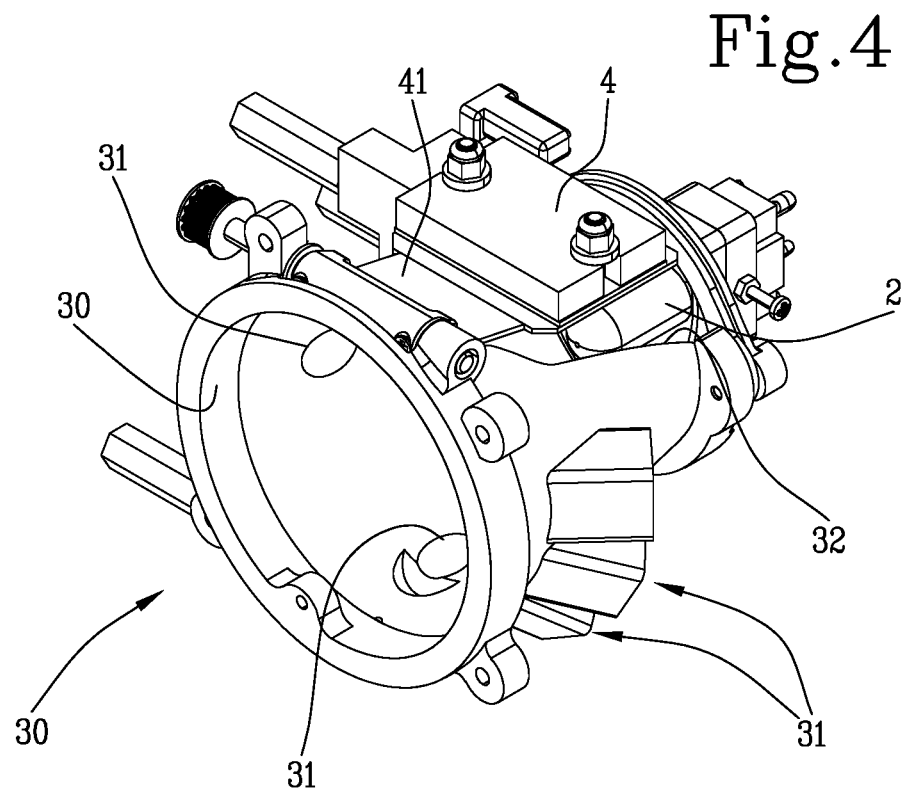

FIGS. 3 and 4 are axonometric views of an inner component of the apparatus, in two different operating configurations; and FIGS. 5 and 6 are longitudinal section views of the component shown in the two preceding figures, shown in the two cited configurations. With reference to the cited figures, with 1 an apparatus has been indicated for the analysis of the agricultural product during the harvesting step, made in accordance with the invention.

The proposed apparatus 1 is specially intended to be fitted to self-propelled agricultural machines like threshers, choppers, forage-collecting wagons, balers, . . . in positions that are a function of the application, but in each case are such as to permit wide sampling of the crop directly on line and on the harvesting machine.

At the practical level, the analysis apparatus 1 of the invention is designed to be "hit" directly by the flow of crop cut and loaded onto the machine to which it is fitted in order to measure in real time the nutritional content of the crop.

In the preferential embodiment shown in the attached figures, the apparatus 1 includes a protective casing 11, for example of polyhedral shape, which completely contains the active components of the invention that are intended to analyse the composition of the harvest.

The casing 11 comprises completely opaque outer walls and a bottom, or anyway an end, which is still opaque but provided with an opening 10, which is instead closed by at least one transparent element 12, 13, preferably made of glass, that enables the light to enter/exit the casing 11. In the embodiment shown, the invention includes two completely transparent glass elements 12, 13 that are parallel to one another, one of which is external that is affected directly by the harvest flow and one of which is internal, protected by the former.

In this manner, if the outer transparent glass element 12 was to be smashed by stones or other objects that are foreign to the harvest that are projected at speed against it, the presence of the inner glass element 13 avoids the risk that those or further small objects enter the casing 11 and hit the aforesaid active elements, damaging them.

The active elements of the invention comprise above all a light source 2, for example a lamp, for sending light radiation to the crop, directed to the opening 10 of the casing 11.

Figure 2:
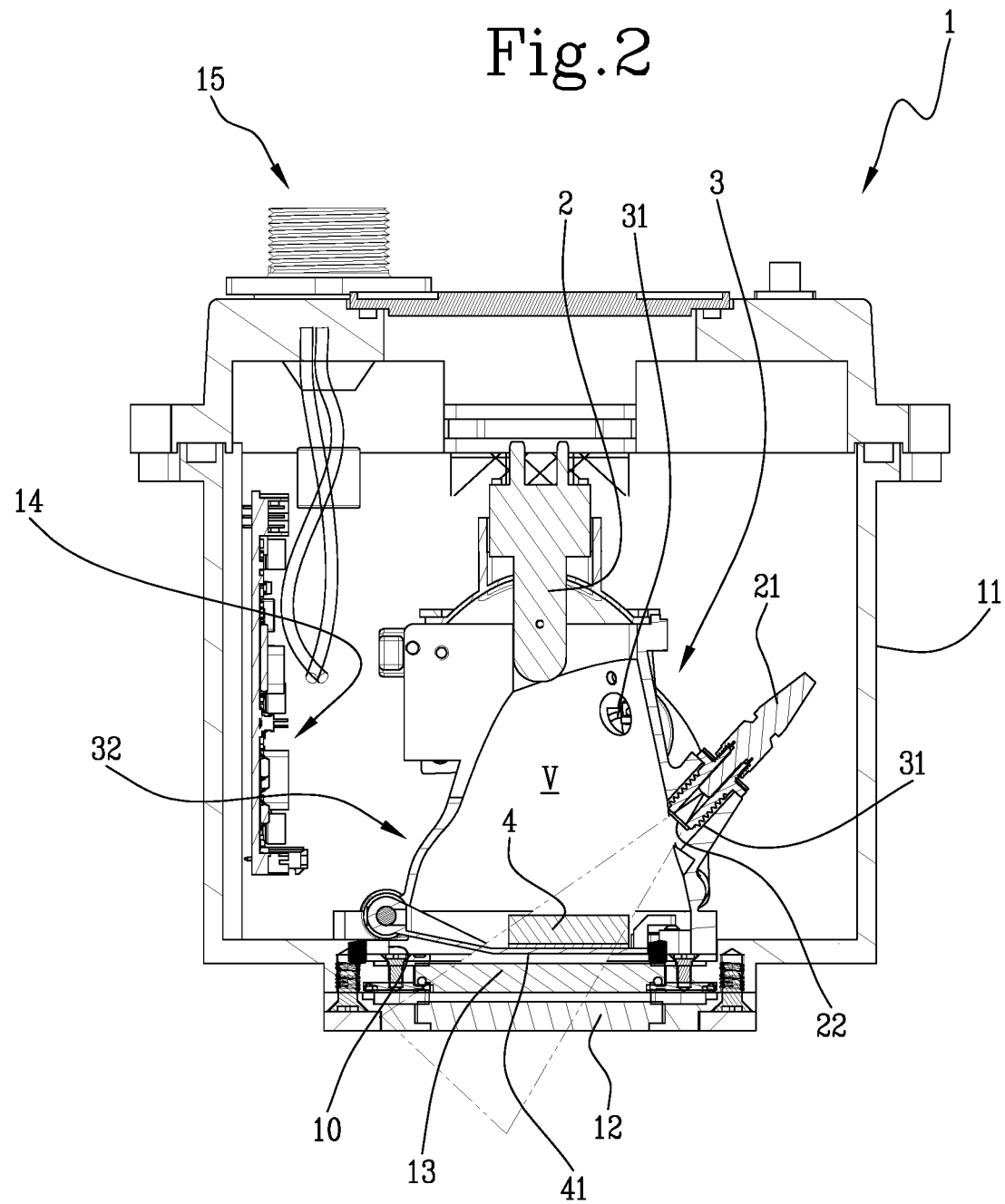
FIG. 2 is a longitudinal section view of the apparatus.

Further, the proposed apparatus 1 includes, protected in the casing 11, a plurality of sensors 21 for acquiring light radiation reflected by the crop and then passed through the aforesaid opening 10 and a plurality of filtering elements 22 that are adapted to permit the complete passage only of light provided with frequencies comprised in a predetermined passband (see FIG. 2).

According to an important aspect of the invention, the filtering elements 22 have passbands that are different from one another and each filtering element is functionally coupled with a respective sensor 21, such that the latter receives only light radiation that has traversed the former.

In practice, the invention provides a plurality of optical sensors 21, preferably of digital type, opposite which, preferably in close proximity, a specific optical filter 22, or another filtering element 22 having the properties illustrated above is placed which has a passband that is different from the passboard of the other filters 22, so that each sensor 21 receives only that part of light reflected by the crop that has frequencies comprised in that passband.

Before illustrating further significant aspects of the invention, one of the important underlying concepts of the invention is explained.

The spectrophotometers are characterized by:
- acquiring the light in a very extended wavelength range, (typically, in line analysis instruments work in the range 950-1800 nanometres, whereas laboratory instruments work from 650 to 2300 nm);
- being able to measure the intensity of the light at wavelengths near one another: the resolution is typically of a few nanometres.

These metrological characteristics of the spectrophotometer enable predictions to be obtained of the content of the analysed crop that are extremely accurate. In fact, owing to the Lambert-Beer law (which shows direct proportionality between the absorption of the reflected light and the concentration of the solution), it is possible to define models that are able to predict extremely accurately the content of the different nutrients in the sample. The invention on the other hand makes available a plurality of light sensors 21, each of which can acquire light energy only from light characterized by a limited spectral range; frequencies/wavelengths comprised in a specific passband.

For example, each characteristic passband may have an amplitude comprised between 50 and 100 nm and the intensity value supplied by the sensor is equivalent to all the light energy affecting the specific sensor.

In practice, the different passbands are predetermined and are the significant passbands in function of one or more nutrients that have to be measured inasmuch as they are present in the crop and are important for the quality of the sample like, by way of non-limiting example, water, protein, starch, neutral cleaned fibres, acid cleaned fibres, ashes, greases, etc.

Accordingly, when the radiation emitted by the light source of the proposed apparatus 1 is reflected by the crop sample opposite the transparent wall 30, it will reach all the filtering elements 22, each of which will only let radiation pass through completely that has frequencies comprised in the characteristic passband of the filtering element 22.

After this, a processing unit 14 of the apparatus 1, to which all the sensors 21 and the source 2 are connected and which is preferably completely contained in the casing 11, will collect the intensity value of the light acquired by the various sensors 21, thereby determining a quantitative measurement of the specific parameters of the harvest that the sensors 21 are supposed to predict.

The processing unit 14 comprises a software or hardware analysis module configured to determine at least one quantitative parameter, whether evaluated as such or on the dry substance, relatively to the agricultural crop analysed, in accordance with the intensity of the light signals acquired by all the sensors 21 hit by reflected light from the samples analysed for that harvest.

In detail, this analysis module is configured to measure the light intensity of the reflected light in the different spectral ranges, measure the absorption thereof, maximize the noise signal ratio through appropriate algorithms and, lastly, obtain the best estimate for the parameter/s by applying the prediction model/s appropriately determined in accordance with the Lambert-Beer law.

Figure 1:
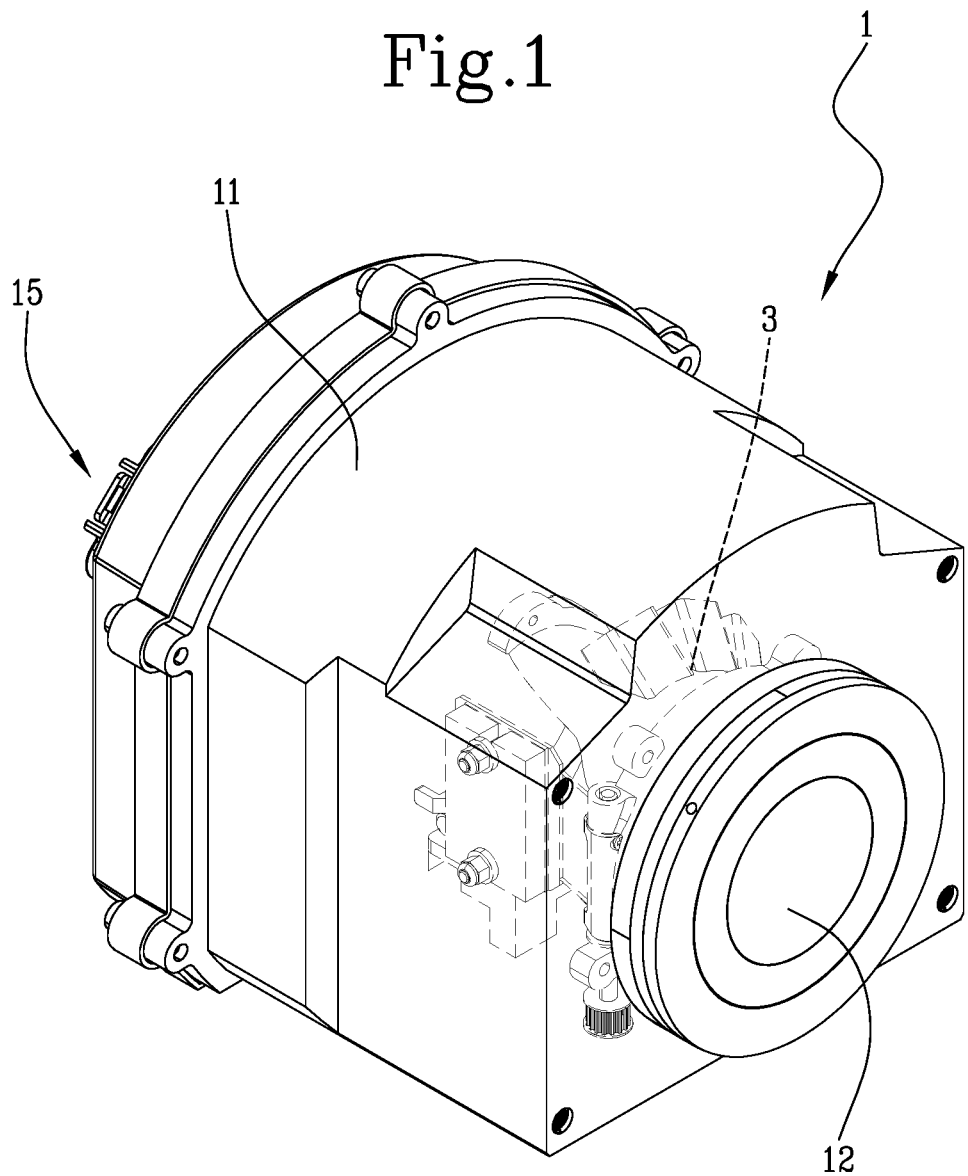
FIG. 1 is a partially transparent axonometric view of the apparatus according to the invention.

As shown in FIGS. 1 and 2, the apparatus 1 includes, completely contained in the casing 11, a support body 3, preferably with the shape of a bell or upturned vase, provided with one or more side walls in which the sensors 21 are fixed.

The walls of the support body 3 define an inner volume V, having a summit (or at least one end) from which the light source 2 emits light radiation.

The support body 3 is fitted inside the casing 11, so that the light source and the sensors 21 fixed thereto face the opening of the bottom of the casing 11 (see again FIG. 2).

In practice, the support body 3 has a flared shape and comprises a main opening 30, in a position opposite the light source 2, the main opening of which faces the opening 10 of the casing 11 (see FIGS. 2-6).

In the embodiment shown, the main opening 30 of the body 3 and that of the casing 11 are in close proximity and, in particular, the edge of the main opening 30 is in contact with or near the inner surface of the bottom of the casing 11, so that the opening of the body 30 faces the inner glass element 13 directly (if present, or at least faces the aforesaid transparent closing element 12, 13), obtaining the result that most of the light reflected by the crop and passing through the opening 10 of the casing 11 traverses the inner volume V of the body 3 and then reaches the filters 22 and the corresponding sensors 21.

In the side wall of the support body 3 oblique through holes 31 are obtained, into which respective sensors 21 are inserted so as to face the main opening 30 and so oriented to maximize the area of the surface "seen" by all the sensors 21; at each hole 31 a filtering element 22 is arranged, preferably in close proximity to the head of the sensor 21 intended to receive the light to be analysed.

The term "oblique", in the preceding paragraph, must be understood with reference to the central axis of the body 3 that passes through the light source 2 or the plane on which the edge of the main opening 30 lies. The holes 31 of the support body 3 can have an inner thread provided for engaging with an outer thread with which the sensors 21 are provided, so as to ensure both solid fixing and precise positioning of the sensors 21.

One important aspect of the invention is the fact that all the sensors 21 are arranged at the same distance from a central point of the main opening 30.

In detail, if the main opening 30 is circular, as preferable, the through holes 31 in which the sensors 21 are located are all that the same identical distance from the geometric centre of the circumference of the opening 30. Preferably, these holes 31 are placed on the same circumference; even more in detail, this circumference is parallel to the circumference of the main opening 30 and thus both have the centre on the same axis, which is the central axis of the body 3.

For this reason, the support body 3 is preferably provided with a circular section at which the holes 31 are obtained.

In this manner, it is obtained that the Euclidean distance between the centre of the filament of the light source, the circular opening 30 and each of the sensors 21 is exactly the same. The angle of inclination of the sensors with respect to the support axis 3 and the corresponding angle between two consecutive sensors 21 will be such as to maximize the intersection between the surfaces scanned by the different sensors. The light reflected by the fraction of sample inside the aforesaid intersection is such as to permit, at any instant, the different spectral information on the same physical sample to be acquired.

The aforesaid holes 31 are arranged at constant or variable angular distances and can be of a number between 5 and 10, like for example 7.

It should be noted that, in a possible embodiment in which no support body 3 made like the one disclosed above is present, in each case the sensors 21 would be placed at the same distance from the centre of the opening 10 of the casing 11 and be distributed in accordance with the conditions set out above.

According to a further important aspect of the invention, the apparatus 1 comprises a reflective calibration element 4, preferably of the high reflection type (for example greater than 90%) that is movable between one position of use in which it is active, being illuminated by the light source 2 (shown in FIGS. 2, 3 and 5) and reflecting the light towards the sensors 21 and a rest position (shown in FIGS. 4 and 6) in which it disappears from the lighted field.

For example, the calibration element can be a white ceramic block 4, characterized by great stability both over time and in temperature.

In any case, the apparatus 1 preferably includes a support element 41, for example a plate, on which the calibration element 4 is fixed and which is hinged on a side wall of the support body 3, so as to be able to move the calibration element 4 between the position of use in which it is between the inner volume V and the rest position, in which it does not reflect light to the sensors 21.

In the embodiment shown, the support body 3 is provided with a second opening 32, obtained on the side wall, at or near an edge of which the hinge of the support element 41 is applied, such that it can be arranged in the opening 32, with the calibration element 4 that faces the outside of the body 3, which constitutes the rest position thereof in which it is distanced from the inner volume V of the body 3.

When the support element 41 takes the calibration element 4 to the position of use, it is substantially in the plane of the main opening 30 and located centrally thereto, so that the light produced by the source 2 hits the reflective surface of the calibration element 4 and is reflected towards the sensors 21, which it reaches simultaneously.

The reason for introducing the internal calibration element is to permit self-calibration of the fast device so as to minimize the impact of the changes of the environmental conditions on the light signal acquired by the sensors 21.

Advantageously, the invention provides a single reference consisting of the calibration element 4, the characteristics of which in a predetermined luminosity condition are known and stored in a memory module of the processing unit 14, the calibration element 4 of which is periodically taken to the use position so that it is lighted by the source 2 and the reflected light is acquired by all the sensors 21.

At this point, the processing unit 14, having available in the memory module the intensity values of the reflected light ($I_R$) in the different passbands in the known reference conditions (the "dark" intensity values ($I_D$) (equivalent to the noise acquired by the sensors 22 in the absence of light dispensed by the source), and the intensity values measured in current operating conditions ($I_C$), is able to calculate absorption for the acquired signal by reading the reflected light of the harvest examined in current work conditions at each sensor 21:

$$A_i = -\log_{10}\left(\frac{(I_{Ci} - I_{Di})}{(I_{Ri} - I_{Di})}\right)$$

Being:
$I_{Ci}$=light intensity of the light reflected by the sample and measured by the nth sensor;
$I_{Ri}$=light intensity of the light reflected by the Reference and measured by the nth sensor;
$I_{Di}$="dark" light intensity measured by the nth sensor;
$\log_{10}$=base 10 logarithm.

In practice, the apparatus 1 comprises a motor that rotates the support element 41 of the ceramic block 4, or another calibration element, the motor of which is controlled by the processing unit 14 so as to take the block 4 to the use position at predetermined intervals, in each case cyclically and in a programmed manner, so as to perform calibration at a frequency that is such as to ensure the reliability of the acquired values.

In general, it should be noted that, in the present description, the processing unit 14 has been presented as being subdivided into distinct functional units for the sole purpose of describing the functions thereof in a clear and complete manner.

In practice, this processing unit 14 can consist of a single electronic device that is suitably programmed to perform the disclosed functions; the different modules can correspond to hardware entities and/or to routine software that are part of the programmed device.

Alternatively or additionally, these functions can be performed by a plurality of electronic devices on which the aforesaid functional modules can be distributed.

In general, the processing unit 14 can use one or more microprocessors or microcontrollers for running the instructions contained in the memory modules.

Optionally, the casing 11 can include a valve 15 for adjusting the internal pressure that, owing to temperature variations, could change significantly.

The invention claimed is:

1. An apparatus (1) effective for real-time analysis of an agricultural crop during harvesting of said agricultural crop, said apparatus (1) comprising (a) a protective casing (11) comprising an opaque outer wall and an end having an opening (10) closed by a transparent element (12, 13), (b) a light source (2) mounted within the protective casing (11) and configured for sending light radiation through the opening (10) and towards the agricultural crop, (c) a support body (3) having one or more side walls and being mounted within the protective casing (11), (d) a plurality of sensors (21) for the acquisition of light radiation reflected by said agricultural crop, and (e) a plurality of filtering elements (22) adapted to enable complete passage only of light having frequencies within a predetermined passband, wherein said filtering elements (22) have passbands that differ from each other and wherein each filtering element (22) is functionally coupled to a respective sensor (21) so that the sensor (21) receives only light radiation that has passed through its respective filtering element (22), the sensors (21) and the filtering elements (22) being mounted within the protective casing (11), wherein each of the plurality of sensors (21) is fixed to said one or more side walls of the support body (3), and wherein all of said sensors (21) are arranged at a same distance from a point located in a central region of the transparent element (12, 13); wherein the apparatus (1) comprises a reflective calibration element (4) that is movable between (a) an active position where it reflects light from the light source (2) towards one or more of the sensors (21), and (b) a rest position in which it does not reflect light from the light source (2) towards one or more of the sensors (21);

wherein the support body (3) is provided with a support body opening (32) configured so that the reflective calibration element (4) can be moved in or through the support body opening (32) when the reflective calibration element (4) is being moved to the rest position.

2. An agricultural harvesting machine configured for harvesting an agricultural crop, said agricultural harvesting machine comprising at least one apparatus (1) according to claim 1.

3. The apparatus (1) according to claim 1, wherein the apparatus (1) also comprises a processing unit, to which all the sensors (21) and the light source (2) are connected, and which is able to collect the intensity value of the light acquired by each of the sensors (21), and to then determine a quantitative measurement of specific parameters of the agricultural crop being harvested;

wherein the processing unit comprises a software or hardware analysis module configured to determine at least one quantitative parameter, whether evaluated as such or on a dry substance, relative to the agricultural crop analysed, in accordance with the intensity of the light acquired by the sensors (21) hit by reflected light from samples being analysed.

4. The apparatus (1) according to claim 1, wherein the support body (3) is bell-shaped and has a circular section at which the sensors (21) and the respective filtering elements (22) are located.

5. The agricultural harvesting machine according to claim 2, wherein the agricultural harvesting machine is self-propelled.

6. The apparatus (1) according to claim 1, wherein the one or more side walls of the support body (3) are provided with through holes (31), each of the respective sensors (21) being provided through a respective through hole (31) and facing the opening (10).

7. The apparatus (1) according to claim 6, wherein the locations of the respective through holes (31) defines a first circumference, and wherein the first circumference defines a first circular disk, said first circular disk defining a plane parallel to a plane defined by a perimeter of the opening (10).

8. The apparatus (1) according to claim 7, wherein the opening (10) defines a second circular disk, the central axis of the first circular disk coinciding with the central axis of the second circular disk.

9. The apparatus (1) according to claim 8, wherein the central axis of the second circular disk extends through a center of a filament of the light source (2).

10. The apparatus (1) according to claim 1, wherein the total number of sensors (21) is between 5 and 10, inclusive.

11. The apparatus (1) according to claim 1, wherein the apparatus (1) comprises a support element (41) on which the reflective calibration element (4) is fixed, the support element (41) being attached adjacent the opening (10) by a hinge, so that the reflective calibration element (4) can be moved from the active position to the rest position.

12. The apparatus (1) according to claim 1, wherein, when the reflective calibration element (4) is in the active position, the reflective calibration element (4) has a reflective surface which is located so that light from the light source (2) is reflected by the reflective surface and reaches the sensors (21) simultaneously.

13. The apparatus (1) according to claim 1, wherein the protective casing (11) is airtight, and the protective casing (11) is provided with a valve (15) for adjusting the internal pressure of the protective casing (11).

* * * * *